United States Patent [19]
Ando et al.

[11] Patent Number: 5,800,925
[45] Date of Patent: Sep. 1, 1998

[54] NONLINEAR OPTICAL MATERIALS AND PROCESS FOR PRODUCING THE SAME

[75] Inventors: Masanori Ando; Kohei Kadono; Masatake Haruta; Toru Sakaguchi; Masaru Miya, all of Ikeda, Japan

[73] Assignee: Agency of Industrial Science & Technology, Tokyo, Japan

[21] Appl. No.: 399,831

[22] Filed: Mar. 7, 1995

[51] Int. Cl.$^6$ ............................................. B32B 15/00
[52] U.S. Cl. ..................... 428/432; 428/433; 428/434; 428/328; 428/701; 428/702
[58] Field of Search ............................. 359/326, 328, 359/329; 252/428; 428/432, 433, 701, 702, 434, 328

[56] References Cited

U.S. PATENT DOCUMENTS

| | | | |
|---|---|---|---|
| 5,348,687 | 9/1994 | Beck | 252/582 |
| 5,401,569 | 3/1995 | Kineri | 359/329 |
| 5,432,635 | 7/1995 | Tanahashi | 359/326 |

FOREIGN PATENT DOCUMENTS

| | | | |
|---|---|---|---|
| 2-44031 | 2/1990 | Japan. | |
| 5341338 | 12/1993 | Japan | 359/329 |

*Primary Examiner*—Timothy Speer
*Attorney, Agent, or Firm*—Nikaido Marmelstein Murray & Oram, LLP

[57] ABSTRACT

There are provided a third-order nonlinear optical material comprising a film formed on the surface of a transparent substrate and consisting essentially of an oxide of a metal selected from the group consisting of V, Cr, Mn, Fe, Co, Ni and Cu; and a third-order nonlinear optical material of the type as described above wherein the film additionally contains a metal selected from the group consisting of Au, Ag and Cu in the form of particles dispersed therein and having a particle size of at most 500 nm. The present invention also provides a process for producing a third-order nonlinear optical material by dispersing and depositing in a transparent matrix an oxide of a metal selected from the group consisting of V, Cr, Mn, Fe, Co, Ni and Cu in the form of particles having a particle size of at most 500 nm; a process of the type as described above wherein a metal selected from the group consisting of Au, Ag and Cu in the form of particles having a particle size of at most 500 nm is simultaneously dispersed and deposited in a transparent matrix. The present invention further provides third-order nonlinear optical materials produced according to the process of the present invention.

2 Claims, 2 Drawing Sheets

NONLINEAR OPTICAL MATERIALS AND PROCESS FOR PRODUCING THE SAME

BACKGROUND OF THE INVENTION

1. Field of the Invention

The present invention relates to nonlinear optical materials and a process for producing the same. More particularly, the present invention relates to novel nonlinear optical materials which are inexpensive and which have an excellent safety, and to a process for producing the same.

2. Description of the Prior Art

Research and development of a third-order nonlinear optical material which is a basic material for a future optical device wherein a nonlinear optical effect is utilized, are in worldwide progress. Known examples of the substances having higher nonlinear optical effects include a glass containing particles of a semiconductor such as CdS dispersed and deposited therein, and a glass containing particles of a noble metal such as gold dispersed and deposited therein. However, these known nonlinear optical materials show a high nonlinear optical effect only when such semiconductor or noble metal is present in particle form, and therefore they scarcely exhibit any nonlinear optical effect when the semiconductor or noble metal is not present in particle form. Thus, the semiconductor or noble metal must be used in particle form in all cases. Further, since the glass serves only as a matrix for dispersion therein of the particles in these conventional nonlinear optical materials and it does not contribute to the increase in nonlinear optical effect, a large amount of the semiconductor particles or noble metal particles must be incorporated in the glass.

However, the amount of the semiconductor or noble metal particles that can be dispersed in the glass is restricted from the viewpoint of the properties thereof and technologies. For example, as for particles of gold, even if ion implantation method is used wherein the largest amount of gold particles can be dispersed and deposited in silica glass at present, only at most about 6.3 atomic % (about 40 wt. %) of gold can be incorporated therein, and beyond this amount a difficulty is encountered in a technological aspect. Accordingly, the third-order nonlinear optical effect of gold particles is restricted by the amount of the gold particles dispersed.

Further, the glass containing the particles of the noble metal dispersed therein, though having a high stability, involves another disadvantage that the resulting third-order nonlinear optical material is expensive due to the high price of the noble metal used as a starting material. Under these circumstances, there has been a need of developing a nonlinear optical material wherein a more inexpensive starting material is used.

The glass containing the particles of a semiconductor such as CdS dispersed and deposited therein is less expensive than that containing gold particles, but there are problems that such glass is liable to decrease in nonlinear optical effect when irradiated with a light, and to get photodarkening possibly due to the adverse effect of alkaline metal ions in the glass. Further, when a porous glass comprising CdS dispersed and deposited therein is allowed to stand for a long period of time, oxidative degradation of CdS proceeds, leading to undesirable variation with time which involves liberation of sulfur, etc. Such phenomenon presents a problem of stability. Another problem of safety arises from the use of cadmium harmful to human bodies.

Furthermore, after the semiconductor particles or noble metal particles are dispersed and deposited in a glass, the processing thereof into an arbitrarily shaped articles such as a fiber or a film needs considerably complicated processing steps and therefore, the industrial productivity thereof remains low.

It has now surprisingly been found that a novel nonlinear optical material which is excellent in safety and which is capable of stably exhibiting a high nonlinear optical effect can be obtained using an inexpensive transition metal oxide. The present invention relates to such a novel nonlinear optical material.

Meanwhile, there has been disclosed a method wherein a porous glass matrix is infiltrated by a dispersion of metal oxide particles, dried, and then heated in an oxygen-containing atmosphere up to 1,500° C. to afford a nonlinear optical material (see, Published Unexamined Japanese Patent Appln. No. 44,031/1990). This method, however, is disadvantageous in that only a porous glass matrix having a larger pore diameter than those of metal oxide particles can be used, and in that the type of the metal oxide capable of forming a dispersion and the size of the resulting metal oxide particles are restricted. Accordingly, there has been a demand for a method wherein particles of a metal oxide of the type and the size chosen in accordance with the purpose with a great freedom of choice can be dispersed and deposited in a porous glass matrix. The present invention also provides a method capable of meeting such a demand.

SUMMARY OF THE INVENTION

The present invention provides a third-order nonlinear optical material comprising a film which is formed on the surface of a transparent substrate and which consists essentially of an oxide of a metal selected from the group consisting of V, Cr, Mn, Fe, Co, Ni and Cu.

The present invention also provides a third-order nonlinear optical material of the type as described above, wherein said film additionally contains a metal selected from the group consisting of Au, Ag and Cu in the form of particles dispersed therein and having a particle diameter of at most 500 nm.

The present invention further provides a process for producing a third-order nonlinear optical material which comprises dispersing and depositing in a transparent matrix an oxide of a metal selected from the group consisting of V, Cr, Mn, Fe, Co, Ni and Cu in the form of particles having a particle diameter of at most 500 nm.

The present invention further provides a process of the type as described above for producing a third-order nonlinear optical material, wherein a metal selected from the group consisting of Au, Ag and Cu is simultaneously dispersed and deposited in the form of particles having a particle size of at most 500 nm in the transparent matrix.

The present invention still further provides a third-order nonlinear optical material produced according to any of the processes of the type as described above.

DESCRIPTION OF THE PREFERRED EMBODIMENTS

Figure 1:
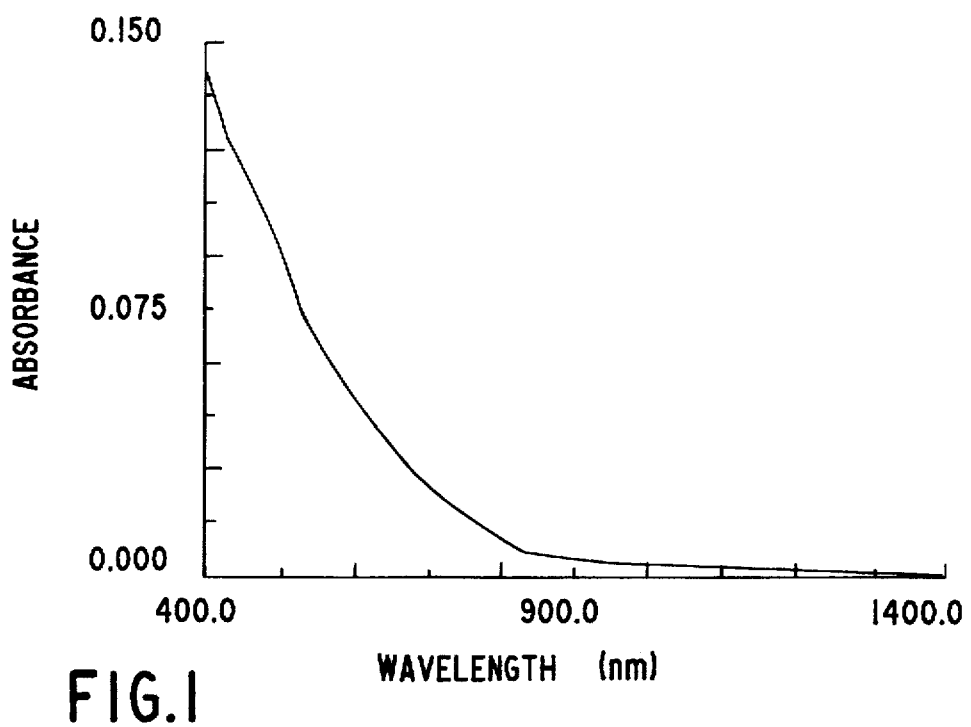
FIG. 1 is a graph showing the optical absorption property of the film of Example 1.
Figure 2:
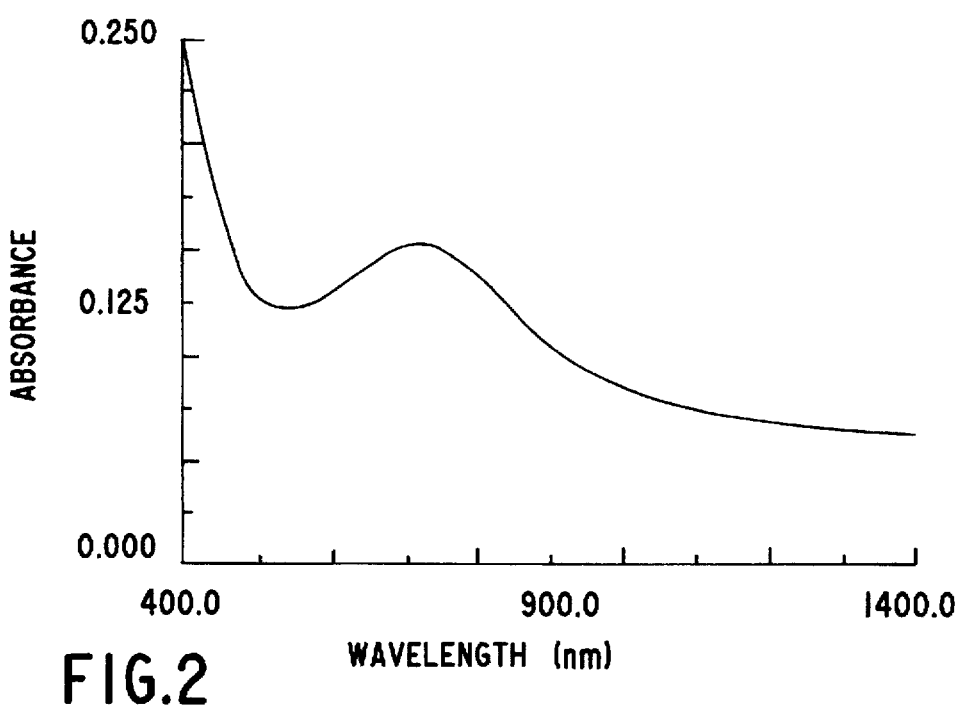
FIG. 2 is a graph showing the optical absorption property of the film of Example 3.
Figure 3:
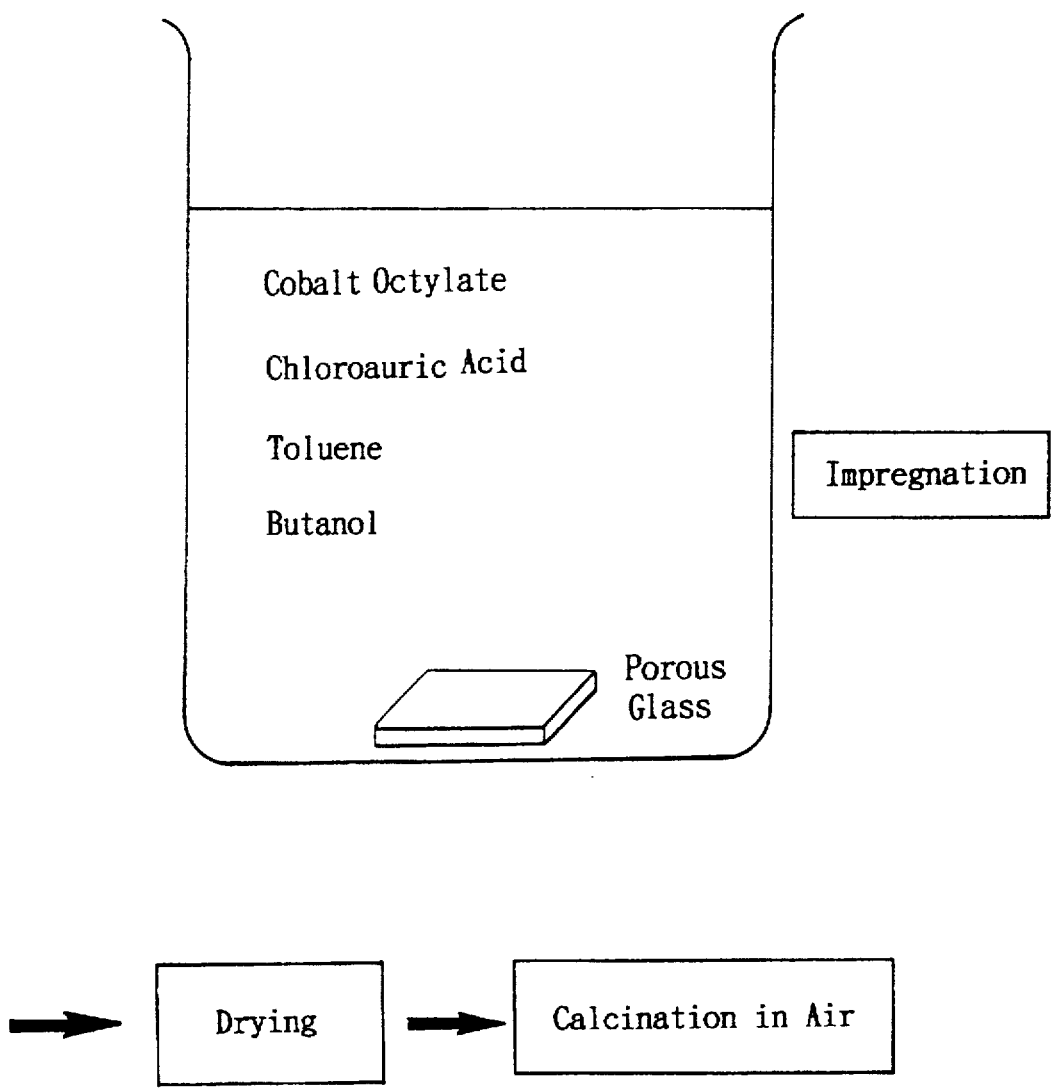
FIG. 3 is a flow sheet illustrating the process of Example 5.

The metal oxide in the film of the third-order nonlinear optical material of the present invention is not particularly restricted in respect of the degree of oxidation, and hence encompasses a variety of oxidized states. Thus, examples of the metal oxide include $V_2O_5$, $Cr_2O_3$, $MnO_2$, $Mn_3O_4$, $Fe_2O_3$, $Fe_3O_4$, CoO, $Co_3O_4$ and CuO. Preferred oxides are $V_2O_5$, $Cr_2O_3$, $Mn_3O_4$, $Fe_2O_3$, $Co_3O_4$, CuO, etc. Besides these simple oxides as mentioned above, mixed oxides such as $MnCo_2O_4$, $NiCo_2O_4$ and $NiMnCo_4O_8$ can also be used. These metal oxides may be used either alone or in combinations thereof.

It has been found that these metal oxides can exhibit a high third-order nonlinear optical effect when irradiated with a strong light such as a laser beam. It is believed that such third-order nonlinear optical effect can be attained only in those metal oxides having the following two features:

(a) having an absorption band corresponding to the wavelength of a laser beam used for irradiation; and (b) having semiconductive properties.

All of the above oxides of V, Cr, Mn, Fe, Co, Ni and Cu that can be used in the present invention exhibit a high third-order nonlinear optical effect.

Although the mechanism by which the above metal oxides can exhibit such effect has not been elucidated yet, it may be as follows: These metal oxides have continuous absorption bands for a wide range of wavelengths including the ultraviolet region, visible light region and near infrared region, and furthermore have semiconductive properties. Accordingly, it is conceivable that, when these metal oxides are irradiated with a laser beam of a frequency close to the energy gap, the density of carriers in an excited state will remarkably increase to the extent that a so-called band-filling effect is produced wherein a saturation absorption occurs and thereby a refractive index changes, whereby a high third-order nonlinear optical effect will be attained. Further, it is probable that a change in refractive index brought about by the temperature elevation accompanying laser beam irradiation also contributes to the manifestation of the third-order nonlinear optical effect.

The particle diameter of the metal oxide to be formed into a film is not particularly limited, and the metal oxide may have any particle diameter in so far as it can be formed into a film.

The film formed on the surface of a transparent substrate and consisting essentially of a metal oxide may further contain a substance capable of facilitating the formation of the metal oxide film, though not contributory in itself to the nonlinear optical effect of the metal oxide, or a substance capable of improving the stability and mechanical strength of the film without adversely affecting the optical transparency of the resulting film. Examples of such substance include $Al_2O_3$, ZnO, and $ZrO_2$. The ratio of the number of the metal atoms of the metal oxide to that of the metal atoms of such an additive substance is preferably in the range of 1:0.01 to 1:0.10.

The film of the nonlinear optical material of the present invention as mentioned above may further contain a metal selected from the group consisting of Au, Ag and Cu in the form of particles having a particle size of at most 500 nm and dispersed in the film. These metal particles may be used either alone or in combinations thereof, and can exert the effect of enhancing the nonlinear optical effect on the resulting nonlinear optical material.

The particle diameter of the metal particles which are capable of being dispersed in the film should be at most 500 nm, in order to enhance the nonlinear optical effect through the quantum size effect thereof, and preferably the particle diameter is in the range of 5 to 100 nm.

The ratio of the number of the metal atoms of the metal oxide to that of the metal atoms of the metal particles is, though not particularly limited, usually in the range of 1:0.05 to 1:4, preferably 1:0.2 to 1:2, in order to inhibit the mutual aggregation of the metal particles due to the heat generated by the irradiation thereof with a laser beam and also in order to ensure the desired nonlinear optical effect.

Examples of the transparent substrate on which the film can be formed include flat-plate substrates formed from glass comprising $SiO_2$ as the main component, quartz, and sapphire made of $Al_2O_3$, among which a glass substrate is preferred.

The film on the transparent substrate can be formed using any suitable technique selected from among various known techniques, and not particularly limited. Suitable examples include vapor phase techniques such as sputter deposition, vacuum evaporation, CVD, and the like; and the coating methods wherein the surface of the substrate is coated with a solution containing a metal alkoxide, a metal nitrate, a metal salt of an organic acid or the like, followed by pyrolysis.

The thickness of the film thus formed is not particularly limited. When the film is used as a nonlinear optical material by transmitting therethrough a laser beam, too thick film is not preferred because the transmittance of light decreases and an output of light becomes weaker due to the absorption thereof by the film, resulting in the decrease in the value of the film as an effective nonlinear optical material. When the film is dense as those formed by sputter deposition, a suitable thickness thereof is usually in the range of about 2 to about 80 nm, preferably 5 to 60 nm. According to the coating method using the solution as mentioned above and subsequent pyrolysis, the resulting film is relatively not dense, and hence it can be used as a nonlinear optical material even if the thickness of the film is larger. On the other hand, when the film of a nonlinear optical material is formed on the surface of an optical waveguide to use evanescent waves leaking from the optical waveguide, even too large a thickness of the film does not cause any problem during use thereof, whereas too thin film can not be used as an effective nonlinear optical material. Therefore, in this case, the film thickness is preferably at least 2 nm, more preferably in the range of 2 to 100 nm, and especially from about 5 to about 50 nm.

The film which additionally contains particles of a metal selected from the group consisting of Au, Ag and Cu can be formed on the surface of a transparent substrate by any of suitable techniques, and not particularly limited. Suitable examples which may be mentioned include a method wherein co-sputter or alternate sputter deposition is effected on the surface of a transparent substrate using a metal oxide target and a metal target; a method wherein a solution of a metal alkoxide, a metal nitrate, a metal salt of an organic acid or the like serving as a precursor of the metal oxide is mixed with a solution of a substance such as chloroauric acid serving as a precursor of metal particles, or with a dispersion of metal particles, and the resulting mixture is formed into a film on the surface of a substrate by spin-coating or the like, and then calcined in an oxygen-containing atmosphere such as air; a method wherein metal particles are fixed on a porous or smooth film of a metal oxide by sputter deposition, application of a dispersion of metal particles, or the like.

The process for producing a third-order nonlinear optical material according to the present invention comprises dispersing and depositing in a transparent matrix an oxide of a metal selected from the group consisting of V, Cr, Mn, Fe, Co, Ni and Cu in the form of particles having a particle size of at most 500 nm.

The type of the metal oxides used in the present process is similar to those as mentioned above for the film of the third-order nonlinear optical material of the present invention. Herein, however, the metal oxides used in the present process should have a particle diameter of at most 500 nm in order to enhance the nonlinear optical effect through the quantum size effect thereof, and the particle diameter is preferably in the range of 5 to 100 nm, more preferably 5 to 50 nm. A suitable amount of the metal oxide particles in the transparent matrix is at least 0.1 wt. %, preferably 2 to 80 wt. %, more preferably 10 to 50 wt. %

Examples of the transparent matrix which may be used in the process of the present invention include glass comprising $SiO_2$ as the main component, quartz, $Al_2O_3$, $ZrO_2$, and the like. The shape of the transparent matrix is not specifically limited to a flat plate, and any arbitrary shape may be used in so far as it is made of a transparent matrix. Porous glass matrix is preferred.

In the process of the present invention, particles of a metal selected from the group consisting of Au, Ag and Cu and having a particle diameter of at most 500 nm may be dispersed and deposited simultaneously with the metal oxide particles. Said metal particles exert the effect of enhancing the nonlinear optical effect on the resulting nonlinear optical material.

An amount of the metal particles introduced into the transparent matrix is at least 0.1 wt. %, preferably 2 to 80 wt. %, more preferably 10 to 50 wt. %.

The metal oxide and the metal in a particle form exhibit a higher nonlinear optical effect when compared, on the basis of a unit number of atoms, with that in a film form, by the quantum size effects thereof like a semiconductor such as CdS. Therefore, a material comprising at least a defined amount of particles of a metal oxide dispersed in a transparent matrix such as glass exhibits a higher nonlinear optical effect than those comprising a metal oxide in a film form which is not in particle form but in a continuous state. The particle diameter of each of the metal oxide and the metal dispersed and deposited in a glass matrix must be at most 500 nm and is preferably in the range of 5 to 100 nm and more preferably 5 to 50 nm, in order to enhance the nonlinear optical effect due to the quantum size effect thereof.

The present process will be described in detail, referring to a porous glass matrix used as a transparent matrix.

The porous glass matrix is impregnated with a solution containing a metal alkoxide such as vanadyl isopropoxide or vanadyl ethoxide, a metal nitrate such as manganese nitrate, cobalt nitrate, ferrous nitrate or copper nitrate, a metal salt of an organic acid such as vanadium octylate, nickel octylate, chromium naphthenate or copper naphthenate, or the like, followed by drying and subsequent pyrolysis.

In case of using sputter deposition technique in the present process, the sputtering is effected by co-sputter or alternate sputter, on a substrate or on a glass differing in refractive index and constituting an optical waveguide, using a silica glass target and a metal oxide target.

In case where the metal particles are dispersed and deposited simultaneously with the metal oxide particles, substantially the same procedures as described above may be used. For example, a porous glass matrix may be impregnated with a solution of a metal alkoxide, a metal nitrate, a metal salt of an organic acid or the like as a precursor of the metal oxide and also with a solution of a substance such as chloroauric acid as a precursor of the metal, followed by drying and subsequent pyrolysis.

When the sputter deposition technique is used for the production of a glass matrix containing both the metal oxide and the metal particles, the deposition is effected by co-sputter or alternate sputter on a substrate or a glass differing in refractive index and constituting an optical waveguide, using a silica glass target, a metal oxide target and a metal target.

The nonlinear optical materials produced according to the process of the present invention may be subjected to a post-treatment such as a heat treatment at a temperature of as high as 600° C. or above in order to decrease light scattering due to pores remaining in the porous glass, thereby improving the nonlinear optical effect thereof.

The process for producing a third-order nonlinear optical material according to the present invention is industrially very advantageous because the contents of the metal oxide particles and of the metal particles in the matrix can easily be increased, the sizes of the metal oxide particles and of the metal particles can easily be controlled, and a wide variety of the metal oxides and the metals can be dispersed and deposited.

The present invention also relates to a third-order nonlinear optical material produced according to the process of the present invention.

In accordance with the present invention, there can be provided a novel nonlinear optical material which is inexpensive, has an excellent safety and is capable of exhibiting a high nonlinear optical effect, and a process for producing the same.

The following Examples will illustrate the present invention in more detail, but they should not be construed as limiting the scope of the present invention.

EXAMPLE 1

A Cu(II) naphthenate film was formed on one surface of a glass substrate (18 mm×18 mm×0.1 mm) by spin-coating using a Cu(II) naphthenate solution having a Cu(II) content of 1 wt. %, and the film was calcinated at 380° C. for 2 hours to form a pale-brown and transparent film of copper oxide (CuO) having a thickness of about 35 nm. The third-order nonlinear optical susceptibility ($\chi^{(3)}$) of this film was $5 \times 10^{-8}$ esu as measured by degenerate four-wave mixing (DFWM) at a wavelength of 532 nm, thus proving that it has a high performance enabling the use thereof as a nonlinear optical material.

EXAMPLE 2

A pale-brown and transparent film of cobalt oxide ($Co_3O_4$) having a thickness of about 60 nm was formed on one surface of a glass substrate (18 mm×18 mm×0.1 mm) by sputter deposition. The third-order nonlinear optical susceptibility ($\chi^{(3)}$) of this film was $4 \times 10^{-8}$ esu as measured by degenerate four-wave mixing (DFWM) at a wavelength of 532 nm.

EXAMPLE 3

A solution of Fe(II) naphthenate in toluene was mixed with a dispersion of gold particles having average particle size of 10 nm in toluene. The resulting mixture (Fe(II) content 1 wt. %; atomic ratio of gold to Fe in the range of 5/100 to 10/100) was applied onto one surface of a glass substrate (18 mm×18 mm×0.1 mm) by spin-coating to form a film of a mixture of Fe(II) naphthenate and gold particles. The film thus formed was calcinated at 380° C. for 2 hours to yield a composite film consisting of iron oxide ($Fe_2O_3$) and gold particles. This film had a thickness of about 30 nm, and was transparent and pale-brown with a tint of claret. The third-order nonlinear optical susceptibility ($\chi^{(3)}$) of this composite film was $1 \times 10^{-7}$ esu as measured by degenerate four-wave mixing (DFWM) at a wavelength of 532 nm, thus proving that it was improved in the performance as a nonlinear optical material by compositing.

EXAMPLE 4

A porous glass matrix (18 mm×18 mm×1.0 mm) having an average pore diameter of 4 nm, a porosity of 28%, and a specific surface area of 200 m$^2$/g was impregnated with a solution containing 5 wt. % manganese nitrate and 5 wt. % cobalt nitrate in toluene, dried, and then calcinated at 380° C. for 2 hours to yield a brownish glass material containing particles of a manganese-cobalt mixed oxide deposited in the pores of the porous glass matrix. The third-order nonlinear optical susceptibility ($\chi^{(3)}$) of the resulting glass material was 10$^{-10}$ esu as measured by degenerate four-wave mixing (DFWM) at a wavelength of 532 nm.

EXAMPLE 5

Chloroauric acid was dissolved in a solution of cobalt octylate in a toluene-butanol mixture. A porous glass matrix (18 mm×18 mm×1.0 mm) having an average pore diameter of 4 nm, a porosity of 28%, and a specific surface area of 200 m$^2$/g was impregnated with the resulting solution (metal content 1 wt. %), dried, and then calcinated at 380° C. for 2 hours to yield a purplish brown material containing cobalt oxide particles and gold particles deposited in the pores of the porous glass matrix. The third-order nonlinear optical susceptibility ($\chi^{(3)}$) of the resulting material was 10$^{-9}$ esu as measured by degenerate four-wave mixing (DFWM) at a wavelength of 532 nm.

What is claimed is:

1. A third-order nonlinear optical material comprising a film which comprises at least one oxide of a metal selected from the group consisting of V, Cr, Mn, Fe, Co, Ni and Cu and which is formed on the surface of a transparent substrate by sputter deposition, vacuum evaporation, chemical vapor deposition, or coating followed by pyrolysis of a solution containing a metal alkoxide, a metal nitrate or a metal salt of an organic acid.

2. A third-order nonlinear optical material as claimed in claim 1, wherein said film additionally contains a metal selected from the group consisting of Au, Ag and Cu in the form of particles dispersed therein and having a diameter of at most 500 nm.

* * * * *